(12) United States Patent
Hu et al.

(10) Patent No.: US 8,665,812 B2
(45) Date of Patent: Mar. 4, 2014

(54) MULTI-USER SCHEDULING INVOLVING RETRANSMISSION

(75) Inventors: Yang Hu, Beijing (CN); Shaohua Li, Beijing (CN); Xinghua Song, Beijing (CN); Haochuan Zhang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 251 days.

(21) Appl. No.: 13/377,187

(22) PCT Filed: Oct. 27, 2011

(86) PCT No.: PCT/CN2011/001792
§ 371 (c)(1),
(2), (4) Date: Dec. 9, 2011

(87) PCT Pub. No.: WO2013/059960
PCT Pub. Date: May 2, 2013

(65) Prior Publication Data
US 2013/0107731 A1    May 2, 2013

(51) Int. Cl.
*H04W 4/00* (2009.01)
(52) U.S. Cl.
USPC .......................................... 370/329
(58) Field of Classification Search
None
See application file for complete search history.

(56) References Cited

U.S. PATENT DOCUMENTS

| | | | |
|---|---|---|---|
| 8,243,673 B2 * | 8/2012 | Hoshino | 370/329 |
| 8,520,579 B2 * | 8/2013 | Kazmi et al. | 370/311 |
| 2010/0195571 A1 * | 8/2010 | Kuri et al. | 370/328 |
| 2010/0202369 A1 * | 8/2010 | Pedersen et al. | 370/329 |
| 2010/0322136 A1 * | 12/2010 | Kanazawa et al. | 370/312 |
| 2011/0085500 A1 * | 4/2011 | Sangiamwong et al. | 370/328 |

* cited by examiner

*Primary Examiner* — Anh-Vu Ly
(74) *Attorney, Agent, or Firm* — Potomac Patent Group PLLC

(57) ABSTRACT

The present invention discloses a network node (100) for multi-user scheduling involving retransmission. The network node comprises a receiver (110) adapted to receive channel quality indicator (CQI) report from a user equipment (UE), an adjuster (120) adapted to adjust signal to interference and noise ratio (SINR) derived from the CQI report to obtain SINR for retransmission, a combiner (130) adapted to combine SINR for initial transmission and SINR for one or a plurality of retransmission to obtain effective SINR, and a scheduler (140) adapted to perform multi-user scheduling on the basis of priority metric derived from the effective SINR. The present invention improves multi-user scheduling by taking HARQ combining gain into account. Instantaneous throughput as well as priority metric can be accurately measured, because SINR from not only channel quality (e.g. CQI) but also HARQ processing gain are both included.

19 Claims, 3 Drawing Sheets

MULTI-USER SCHEDULING INVOLVING RETRANSMISSION

TECHNICAL FIELD

The present invention generally relates to the field of wireless communication, and more particularly relates to multi-user scheduling involving retransmission.

BACKGROUND

In wireless communication systems, the general functionality of a scheduler is to schedule data to a set of user equipments (UEs) on a shared set of physical resources. In general, scheduling algorithms can make use of two types of measurement information to inform the scheduling decisions, namely channel state information and traffic measurement (e.g. priority, fairness, etc). These are obtained either by performing measurements at a network node or via feedback signaling channels, or a combination of both.

There are different types of scheduling algorithms, such as Round Robin scheduling, opportunistic scheduling and proportional fair scheduling. Specifically, Round Robin scheduling gives the same priority to all the users and allocates time/frequency resources to users following a fixed manner. This type of scheduling does not consider the instantaneous channel quality of different users and multi-user diversity gain is not explored. Opportunistic scheduling is typically designed to maximize the sum of the transmitted data rates to all users simultaneously experiencing good channel conditions at different times and frequencies. But this results in the difficulty of ensuring fairness and Quality of Service (QoS) since users' data cannot always wait until the channel conditions are sufficiently favorable for transmission. Proportional fair scheduling pays more attention to latency for each user than to the total data rate achieved. This is particularly important for real-time applications such as Voice-over-IP (VoIP) or video-conferencing where a certain minimum rate must be guaranteed independently of the channel state.

Generally, the latter two scheduling algorithms, i.e., the opportunistic scheduling and the proportional fair scheduling can be described as priority metric by equation (1):

$$P(k) = \frac{tp(k)}{\gamma^\beta(k)} \quad (1)$$

where k is the user index, tp and $\gamma$ are respectively defined as instantaneous throughput and averaged throughput within a time window. $\beta$ is a fairness factor, which tunes overall system throughput and user fairness. In particular, $\beta$ can be 0 (opportunistic scheduling) or 1 (proportional fair scheduling).

More specifically, tp is calculated by user's signal to interference and noise ratio (SINR) on the basis of Shannon capacity criterion, for example as the following equation (2), where SINR can be fed back by UE as channel quality indicator (CQI) report or can be directly measured by the network node, $\eta(0 \leq \eta \leq 1)$ is an adjusting factor between ideal Shannon capacity and real throughput.

$$tp(k) = \eta \cdot \log_2[1+\text{SINR}(k)] \quad (2)$$

Meanwhile, $\gamma$ is averaged throughput and filtered in time domain, which is defined in the following equation (3), where $\lambda$ is a forgetting factor, and $0 \leq \lambda \leq 1$.

$$\gamma(k,t) = \gamma(k,t-1) \cdot \lambda + tp(k) \cdot (1-\lambda) \quad (3)$$

However, when retransmission takes place in a wireless communication system, user fairness in the above described multi-user scheduling approaches cannot be properly guaranteed.

SUMMARY

An object of the present invention is to provide a method for use in a network node for multi-user scheduling involving retransmission and a corresponding network node, which obviates the above-mentioned disadvantage.

According to a first aspect of the present invention, there is provided a method for use in a network node for multi-user scheduling involving retransmission.

The method begins with receiving CQI report from a UE. Then, SINR derived from the CQI report is adjusted to obtain SINR for retransmission. After that, SINR for initial transmission and SINR for one or a plurality of retransmission are combined to obtain effective SINR. At last, multi-user scheduling (e.g., opportunistic scheduling or proportional fair scheduling) is performed on the basis of priority metric derived from the effective SINR.

Optionally, said retransmission is following hybrid automatic repeat request (HARQ) scheme.

As to the above priority metric, it can be obtained on the basis of instantaneous throughput in the transmission or the retransmission and averaged throughput within a time window, both of which are derived from the effective SINR.

Further, the SINR for retransmission can be obtained by adding the SINR derived from the CQI report and an adjustment value determined by outer-loop adjustment.

According to an embodiment, for HARQ combining, the step of combining described above is performed according to one of the schemes of Chase combining (CC), incremental redundancy (IR), and hybrid CC and IR. In the scheme of IR or hybrid CC and IR, said combining is performed by means of mutual information.

According to a second aspect of the present invention, there is provided a network node for multi-user scheduling involving retransmission. The network node is applicable to carry out the above described method according to the present invention. Further, the network node can be a constituent part of a Time Division Duplex (TDD) or Frequency Division Duplex (FDD), single-cell multi-user or multi-cell multi-user communication system as a third aspect of the present invention, which also comprises a plurality of UEs adapted to feedback CQI report.

According to a fourth aspect of the present invention, there is provided a computer program product. The computer program product comprises a computer readable medium, having stored thereon computer executable codes, when executed, causing a processor to perform the method according to the present invention.

According to a fifth aspect of the present invention, there is provided a computer readable medium, having stored thereon computer executable codes, when executed, causing a processor to perform the method according to the present invention.

The present invention improves multi-user scheduling by taking HARQ combining gain into account. Instantaneous throughput as well as priority metric can be accurately measured, because SINR from not only channel quality (e.g. CQI) but also HARQ processing gain are both included.

Of course, the present invention is not limited to the above embodiments and advantages. Indeed, those skilled in the art

DETAILED DESCRIPTION

In the following description, for purposes of explanation rather than limitation, specific details, such as the particular architecture, structure, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It is to be understood that the features of the various exemplary embodiments described herein may be combined with each other, unless specifically noted otherwise.

Figure 1:
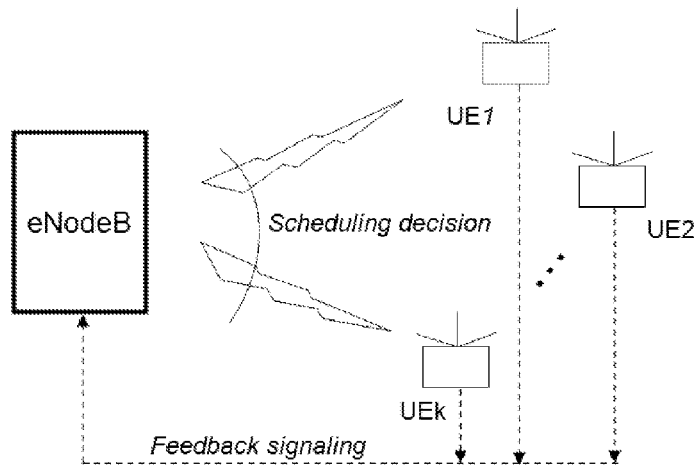
FIG. 1 is a diagram illustrating multi-user scheduling with feedback signaling.

FIG. 1 is a diagram illustrating multi-user scheduling with feedback signaling. As shown in FIG. 1, time-frequency resource is shared by multiple users (i.e., UEs) according to scheduling decisions. As described above, scheduling algorithms can inform the scheduling decisions by using the channel state information and traffic measurement. These are obtained either by performing measurements at a network node or via feedback signaling channels, or a combination of both.

Figure 2:
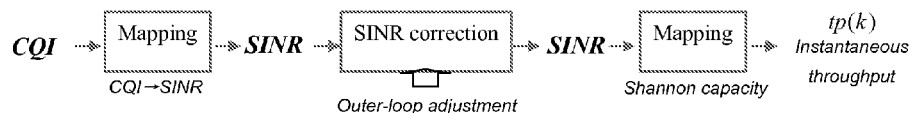
FIG. 2 is a diagram illustrating SINR calculation with correction.

As described above, SINR is used to capture instantaneous throughput (equation (2)), which is common to both the opportunistic scheduling and the proportional fair scheduling. To obtain a suitable SINR, as shown in FIG. 2, a CQI report from a UE is firstly mapped to SINR, and then the SINR is corrected by some algorithm, e.g. outer-loop adjustment. And the corrected SINR is further mapped with e.g. Shannon capacity to the instantaneous throughput.

Figure 3:
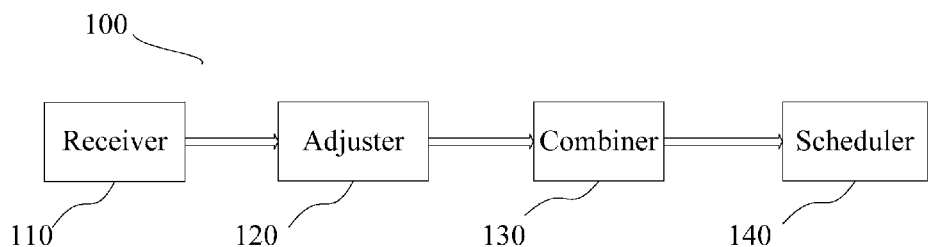
FIG. 3 is a block diagram illustrating a network node for multi-user scheduling involving retransmission according to an embodiment of the present invention.

FIG. 3 is a block diagram illustrating a network node for multi-user scheduling involving retransmission according to an embodiment of the present invention.

As shown in FIG. 3, the network node 100 may comprise a receiver 110, an adjuster 120, a combiner 130, and a scheduler 140.

According to an embodiment of the present invention, the network node 100 may be one of base station, Node B, or evolved Node B (eNB). Hereinafter, the present invention will be described with respect to eNB for Long Term Evolution (LTE). However, such description is only exemplary, rather than restrictive, and the base station, Node B, or other entities with similar structures also apply to the present invention.

According to the present invention, the receiver 110 may receive CQI report from a UE, from which SINR can be derived, for example as described above in connection with FIG. 2. Alternatively, the SINR can be measured by eNB itself. Then, the adjuster 120 can adjust the SINR to obtain SINR for retransmission.

According to an embodiment of the present invention, the retransmission may be those involved in HARQ scheme. However, this is only exemplary, rather than restrictive, and other transmission scheme of wireless communication including retransmission may also apply to the present invention.

HARQ is an important technology adopted widely in wireless communication systems, such as LTE, UMTS (Universal Mobile Telecommunication Service), and WiMAX (Worldwide Interoperability for Microwave Access). HARQ plays a key role in maximizing spectral efficiency at the expense of increased delay while retransmission takes place, whereas maximal spectral efficiency may not be essential in situations where minimum latency is required. So, the users when enabling retransmission in HARQ should be set priority as high as possible to reduce latency.

Figure 4:
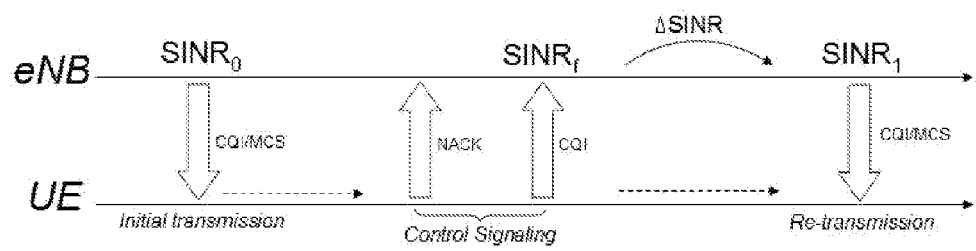
FIG. 4 is a diagram illustrating downlink HARQ implementation according to an embodiment of the present invention.

FIG. 4 is a diagram illustrating downlink HARQ implementation according to an embodiment of the present invention. According to HARQ implementation and Modulation and Coding Scheme (MCS) determination by eNB, some SINR values known by eNB can be utilized, such as SINR for initial transmission ($SINR_0$), SINR derived from the CQI report from UE ($SINR_f$), and an adjustment value determined by eNB outer-loop adjustment ($\Delta SINR$). Thus, the adjuster 120 obtains the SINR for retransmission by adding the SINR derived from the CQI report and the adjustment value, i.e. $SINR_1 = SINR_f + \Delta SINR$.

Then, the combiner 130 can combine the SINR for initial transmission and SINR for one or a plurality of retransmission to obtain effective SINR. According to an embodiment of the present invention, the combiner 130 perform the combination according to one of the schemes of Chase combining (CC), incremental redundancy (IR), and hybrid CC and IR.

(a) Chase Combining (CC)

For pure CC case, the effective SINR for Exponential Effective Signal Interference Ratio (SIR) Mapping (EESM) in the case of CC is given by:

$$SINR_{eff} = \sum_{n=0}^{q-1} SINR_n \qquad (4)$$

where q is the number of transmission. This holds true when the same modulation scheme is applied for both initial transmission and retransmission.

(b) Incremental Redundancy (IR)

For pure IR case, $f(\cdot)$ is mutual information (MI) as a function of SINR and MCS, while $f^{-1}(\cdot)$ is the inverse function of $f(\cdot)$. Both $f(\cdot)$ and $f^{-1}(\cdot)$ are widely used and can be found in prior art documents. Hence, let $M_n = f(sINR_n)$ be the mutual information of $n^{th}$ retransmission and $C_n$ be the length of coded bit in the $n^{th}$ retransmission, where $n=0,\ldots,q-1$. So, accumulated mutual information and the effective SINR are respectively calculated as:

$$M = \frac{\sum_{n=0}^{q-1} C_n M_n}{\sum_{n=0}^{q-1} C_n} \quad (5)$$

$$SINR_{eff} = f^{-1}(M) \quad (6)$$

where performing $f^{-1}(\cdot)$ needs to consider coding rate varying in retransmission.

(c) Hybrid CC and IR (CC+IR)

Figure 5:
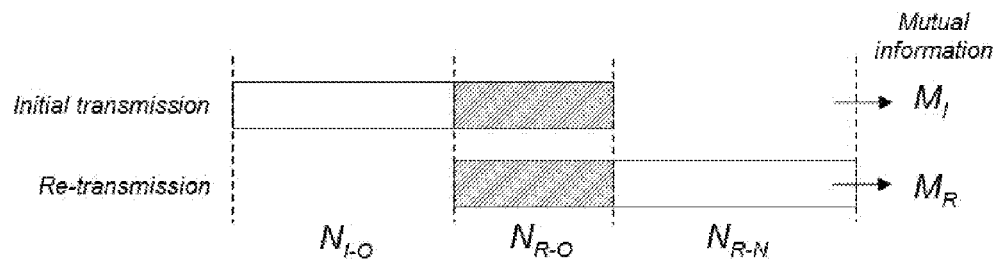
FIG. 5 is a diagram illustrating hybrid CC and IR implementation according to an embodiment of the present invention.

To handle a general case, we consider retransmission with $N_{R-N}$ new coded bits and $N_{R-O}$ repeated bits. $N_{I-O}$, $M_I$, $M_R$ are coded bits not transmitted in this re-transmission, mutual information of initial transmission, and mutual information of retransmission, respectively, for example as shown in FIG. 5.

The effective SINR is then calculated as:

$$M = \frac{N_{I-O} \cdot M_I + N_{R-N} \cdot M_R + N_{R-O} \cdot f}{N_{I-O} + N_{R-N} + N_{R-O}} \quad (7)$$

$$SINR_{eff} = f^{-1}(M) \quad (8)$$

This scheme is common to both pure CC case and pure IR case.

As described above in the (b) and (c) cases, the combiner 130 combines the SINR by means of mutual information.

With the effective SINR obtained by the combiner 130 with the above mentioned schemes, instantaneous throughput in the transmission or the retransmission can be calculated according to the above described equation (2). Thus, the priority metric can be obtained on the basis of the instantaneous throughput and averaged throughput within a time window according to the above described equation (1).

Then, the scheduler 140 can perform multi-user scheduling on the basis of the priority metric. According to an embodiment of the present invention, the scheduler performs the multi-user scheduling by means of the opportunistic scheduling or the proportional fair scheduling.

The network node 100 according to the above-described embodiments of the present invention may apply to Time Division Duplex (TDD) or Frequency Division Duplex (FDD), single-cell multi-user or multi-cell multi-user communication systems. The system may also comprise a plurality of UEs adapted to feedback the CQI to the network node 100.

Figure 6:
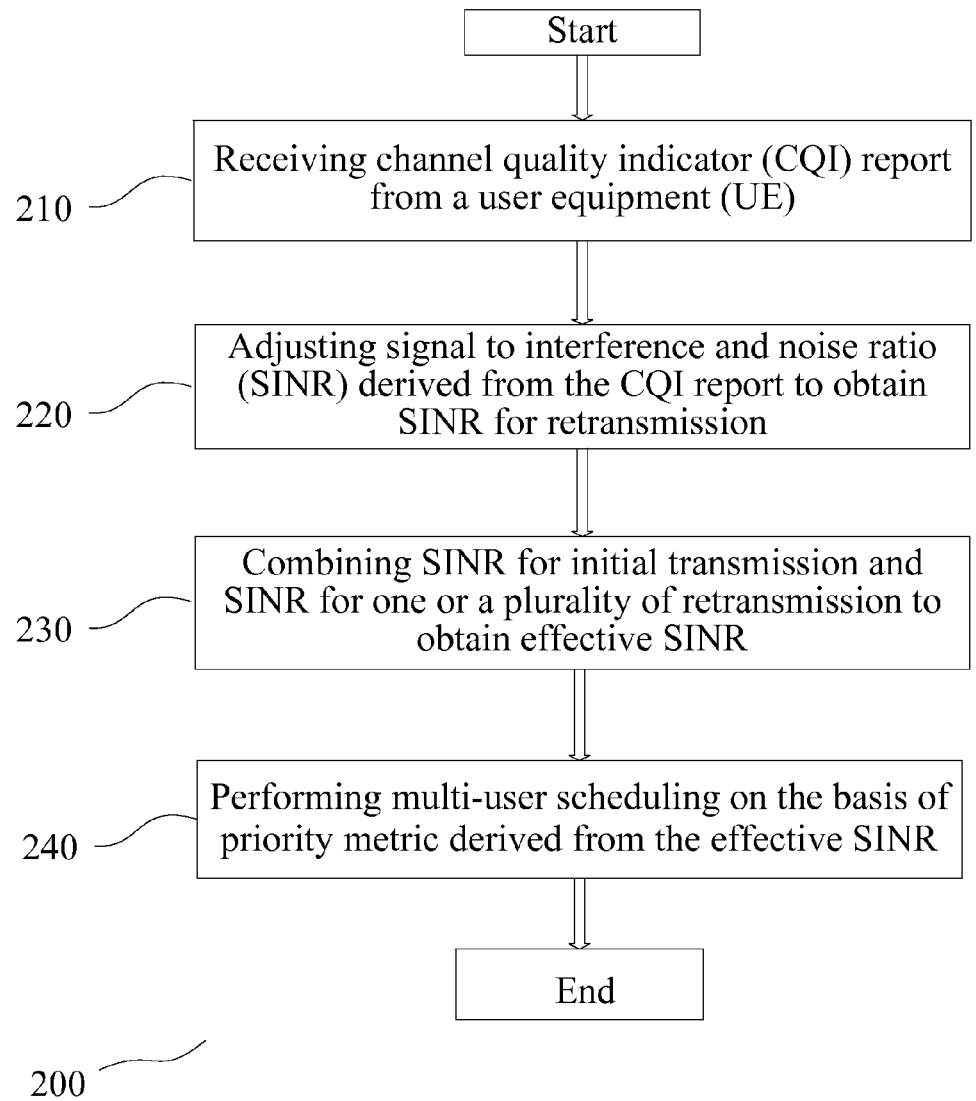
FIG. 6 is a flow chart illustrating a method for use in a network node for multi-user scheduling involving retransmission according to an embodiment of the present invention.

FIG. 6 is a flow chart illustrating a method for use in a network node for multi-user scheduling involving retransmission according to an embodiment of the present invention.

Optionally, the method 200 can be performed by the above-described network node 100 according to the present invention. As described above, the present invention will be described with respect to eNB for LTE. However, such description is only exemplary, rather than restrictive, and the base station, Node B, or other entities with similar structures also apply to the present invention.

As shown in FIG. 6, the method 200 begins with a step 210 of receiving CQI report from a UE, from which SINR can be derived, for example as described above in connection with FIG. 2. Alternatively, the SINR can be measured by eNB itself. Optionally, the step 210 can be performed by the above-described receiver 110 according to the present invention.

Then, at the step 220, the SINR is adjusted to obtain SINR for retransmission. Optionally, the step 220 can be performed by the above-described adjuster 120 according to the present invention.

As described above, the retransmission may be those involved in HARQ scheme. However, this is only exemplary, rather than restrictive, and other transmission scheme of wireless communication including retransmission may also apply to the present invention.

According to an embodiment of the present invention, the SINR for retransmission is obtained by adding the SINR derived from the CQI report and an adjustment value determined by outer-loop adjustment. The above description of the example of obtaining the SINR for retransmission by the adjuster 120 made with reference to FIG. 4 also applies to the adjusting step 220, and is thus not iterated for the sake of conciseness.

Then, at the step 230, SINR for initial transmission and SINR for one or a plurality of retransmission are combined to obtain effective SINR. Optionally, the step 230 can be performed by the above-described combiner 130 according to the present invention.

According to an embodiment of the present invention, the combining step 230 is performed according to one of the schemes of CC, IR, and hybrid CC and IR.

The above description with respect to cases (a) pure CC, (b) pure IR, and (C) hybrid CC and IR may also apply to the combining step 230, and is thus not iterated for the sake of conciseness.

As described above in the (b) and (c) cases, the combining step 230 is performed by means of mutual information.

With the effective SINR obtained by the combining step 230 with the above mentioned schemes, instantaneous throughput in the transmission or the retransmission can be calculated according to the above described equation (2). Thus, the priority metric can be obtained on the basis of the instantaneous throughput and averaged throughput within a time window according to the above described equation (1).

Then, at the step 240, multi-user scheduling is performed on the basis of the priority metric. According to an embodiment of the present invention, the scheduling step 240 is performed by means of opportunistic scheduling or proportional fair scheduling.

Embodiments of the present invention may be implemented in hardware, or as software modules running on one or more processors, or in a combination thereof. That is, those skilled in the art will appreciate that special hardware circuits such as Application Specific Integrated Circuits (ASICs) or Digital Signal Processors (DSPs) may be used in practice to implement some or all of the functionality of all components of the network node according to an embodiment of the present invention. Some or all of the functionality of the components of the network node may alternatively be implemented by a processor of an application server in combination with e.g. a computer program product comprising a computer readable medium having stored thereon computer executable codes, which computer executable codes when executed on the processor causes the application server to perform, for example, the steps of the methods according to an embodiment of the present invention.

The present invention may also be embodied as one or more device or apparatus programs (e.g. computer programs and computer program products) for carrying out part(s) or all of the steps of the methods described above. Such programs embodying the present invention may be stored on computer readable medium, or could, for example, be in the form of one or more signals. Such signals may be data signals downloadable from an Internet website, or provided on a carrier signal, or in any other forms.

Thus, the present invention advantageously takes HARQ with combining gain into account, and thus the gain by applying CC, IR or the combination thereof can be truly reflected in multi-user scheduling. In contrast, conventional scheduling approaches make no difference when it faces initial transmission and retransmission, and CQI report from a UE or SINR measured by an eNB only reflects instantaneous channel gain without processing gain from signal processing perspective.

Considering following issues in implementation:

(i) Instantaneous Channel Quality Estimation.

Taking HARQ combining gain into SINR calculation, the instantaneous throughput can be correctly calculated or reflected, since the throughput should be the one with correct transmission. SINR improvement by HARQ is included to reflect true combining gain. Whereas in conventional scheduling approaches, underestimated SINR calculation makes lower priority factor for scheduling.

(ii) Single-Cell Scheduling Behavior.

In conventional scheduling approaches, with possibly lower priority factor, priority sorting among the users waiting for retransmission could lead to improper scheduling. For instance, a user having higher throughput (and also higher priority factor) than others when considering HARQ combining gain may not be properly scheduled according to the conventional scheduling approaches, which could happen especially when all users for retransmission cannot be served simultaneously. Whereas, such users can be properly scheduled according to the present invention.

(iii) Multi-Cell Scheduling Behavior.

Figure 7:
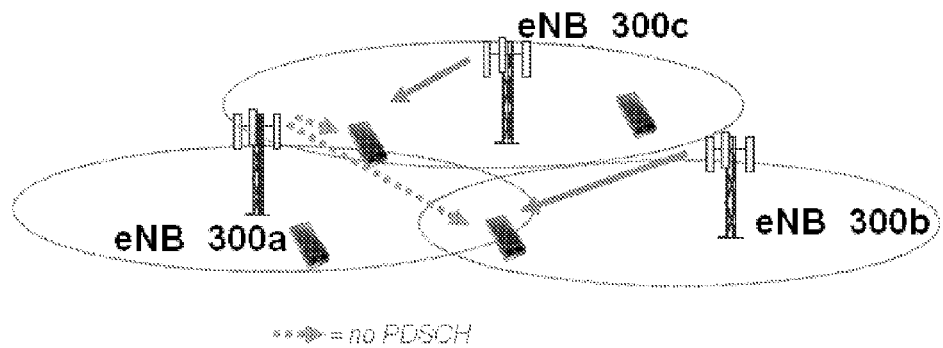
FIG. 7 is diagram illustrating eNB muting in a multi-cell scheduling behavior.

Muting of eNB is applied to dynamically enable minimizing inter-cell interference among cooperated cells. One example with three cells is shown in FIG. 7, where one cell silences its data transmission (i.e. no Physical Downlink Shared Channel (PDSCH) transmission in LTE) to reduce interference to neighboring cells and maximize overall capacity. Whether to make silence for some eNB depends on multi-cell priority metric, as described in equation (4), where I and S are the set of scheduled users and the set of active cells among cooperated cells, respectively.

$$P(I, S) \approx \underset{I,S}{\mathrm{argmax}} \sum_{i \in I} \frac{tp(i, S)}{\gamma^{\beta}(i)} \quad (9)$$

Thereby, if only instantaneous interference condition is considered and hence one eNB serving the user with retransmission is silenced, latency for this eNB is not considered though such consideration is performed within each eNB scheduling. According to present invention, the priority sorting among multi-cell scheduling can be objectively reflected due to the properly estimated throughput per eNB. In contrast, the underestimated throughput in the conventional scheduling approaches results in improper priority sorting, which even happens for the eNB with initial transmission.

In conclusion, the present invention improves multi-user scheduling by taking HARQ combining gain into account. Instantaneous throughput as well as priority metric can be accurately measured, because SINR from not only channel quality (e.g. CQI) but also HARQ processing gain are both included. More specifically, a simplified scheme by means of SINR for both initial transmission and retransmission is proposed to capture HARQ combining gain. This present invention is applicable to both FDD and TDD, both single-cell multi-user scheduling and multi-cell multi-user scheduling.

It should be noted that the aforesaid embodiments are exemplary rather than limiting the present invention, substitute embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. In the apparatus claims that list several components, several ones among these components can be specifically embodied in the same hardware item. The use of such words as first, second, third does not represent any order, which can be simply explained as names.

The invention claimed is:

1. A network node for multi-user scheduling involving retransmission, comprising:
   a receiver adapted to receive channel quality indicator (CQI) report from a user equipment (UE);
   an adjuster adapted to adjust signal to interference and noise ratio (SINR) derived from the CQI report to obtain SINR for retransmission;
   a combiner adapted to combine SINR for initial transmission and SINR for one or a plurality of retransmission to obtain effective SINR; and
   a scheduler adapted to perform multi-user scheduling on the basis of priority metric derived from the effective SINR.

2. The network node according to claim 1, wherein the priority metric is obtained on the basis of instantaneous throughput in the transmission or the retransmission and averaged throughput within a time window, both of which are derived from the effective SINR.

3. The network node according to claim 1, wherein the adjuster obtains the SINR for retransmission by adding the SINR derived from the CQI report and an adjustment value determined by outer-loop adjustment.

4. The network node according to claim 1, wherein the retransmission is involved in hybrid automatic repeat request (HARQ) scheme.

5. The network node according to claim 4, wherein the combiner combines the SINR for the initial transmission and the SINR for one or a plurality of retransmission according to one of the schemes of Chase combining (CC), incremental redundancy (IR), and hybrid CC and IR.

6. The network node according to claim 5, wherein the combiner combines SINR according to the scheme of IR or hybrid CC and IR by means of mutual information.

7. The network node according to claim 1, wherein the scheduler performs the multi-user scheduling on the basis of the priority metric by means of opportunistic scheduling or proportional fair scheduling.

8. The network node according to claim 1, wherein the network node is one of base station, Node B, or evolved Node B (eNB).

9. A Time Division Duplex (TDD) or Frequency Division Duplex (FDD), single-cell multi-user or multi-cell multi-user communication system, comprising:
   a plurality of user equipments (UEs) adapted to feedback channel quality indicator (CQI) report; and
   the network node according to claim 1.

10. A method for use in a network node for multi-user scheduling involving retransmission, comprising:
    receiving channel quality indicator (CQI) report from a user equipment (UE);

adjusting signal to interference and noise ratio (SINR) derived from the CQI report to obtain SINR for retransmission;

combining SINR for initial transmission and SINR for one or a plurality of retransmission to obtain effective SINR; and performing multi-user scheduling on the basis of priority metric derived from the effective SINR.

11. The method according to claim 10, wherein the priority metric is obtained on the basis of instantaneous throughput in the transmission or the retransmission and averaged throughput within a time window, both of which are derived from the effective SINR.

12. The method according to claim 10, wherein the SINR for retransmission is obtained by adding the SINR derived from the CQI report and an adjustment value determined by outer-loop adjustment.

13. The method according to claim 10, wherein the retransmission is involved in hybrid automatic repeat request (HARQ) scheme.

14. The method according to claim 13, wherein the step of combining is performed according to one of the schemes of Chase combining (CC), incremental redundancy (IR), and hybrid CC and IR.

15. The method according to claim 14, wherein the step of combining according to the scheme of IR or hybrid CC and IR is performed by means of mutual information.

16. The method according to claim 10, wherein the step of scheduling is performed by means of opportunistic scheduling or proportional fair scheduling.

17. The method according to claim 10, wherein the network node is one of base station, Node B, or evolved Node B (eNB).

18. A computer program product, comprising a non-transitory computer readable medium, having stored thereon computer executable codes, when executed, causing a processor to perform the method according to claim 10.

19. A non-transitory computer readable medium, having stored thereon computer executable codes, when executed, causing a processor to perform the method according to claim 10.

* * * * *